INVENTOR
Arvid I. Ericsson
BY Dressler, Goldsmith, Clement & Gordon
ATTORNEYS

United States Patent Office 3,442,734
Patented May 6, 1969

3,442,734
COMBINATION STRAP TENSIONING AND SEALING TOOL
Arvid I. Ericsson, Fort Lauderdale, Fla., assignor to Signode Corporation, a corporation of Delaware
Filed Feb. 2, 1966, Ser. No. 524,431
Int. Cl. B32b *31/00;* B65b *13/32, 51/10*
U.S. Cl. 156—73                    25 Claims

ABSTRACT OF THE DISCLOSURE

A method and apparatus for providing a ligature about an article including providing a length of thermoplastic strap having a tensioned loop and overlapping end portions. The end portions of the length of strap are first compressed and then a tension free end portion of the strap is moved unidirectionally relative to the other strap end portion to effect interface melting between the overlapping end portions. The joint is finally formed by maintaining the interface regions in fusing contact until solidification is effected.

Background of the invention

This invention relates to a method and apparatus for providing a ligature of thermoplastic strap in binding engagement about an article. The disclosure of this application is related to the disclosure in Stensaker application, Ser. No. 524,432 filed concurrently herewith, the disclosure of which to the extent not inconsistent herewith is specifically incorporated herein by this reference.

More particularly, this invention is concerned with apparatus arrangements engageable with thermoplastic strap portions at opposite ends of an article encircling strap loop, the apparatus then being operable to draw these strap portions in a loop shrinking direction to tighten and hold the loop in binding engagement about the article, with one of the overlapping strap portions being free to be slacked up in preparation for driving the same unidirectionally to effect a controlled bodily sliding frictional movement between contacting surface regions of the overlapping strap portions. Sufficient pressure is maintained during and after the unidirectional bodily sliding frictional movement unit a friction-fusion joint is created between the overlapping thermoplastic strap portions.

In the disclosed apparatus of this type, separate tensioning facilities and sealing facilities are provided. The tensioning or loop constricting facilities first operate to draw full tension on a loop of strap that encircles the articles to be tied and to hold tension while sealing is accomplished. The sealing or friction-fusion joint forming facilities impose pressure between an inner strap portion which is under full loop tension and an outer overlapping strap portion which is free of tension and capable of being moved while loop tension is held. The sealing facilities include a slidably movable gripper shoe or pressure jaw which is engageable with the outer tension free strap portion to shift the same for drawing slack in preparation for a power stroke during which contacting interface regions of the overlapping strap portions undergo one way relative sliding movement while subjected to sufficient pressure to effect mutual interface melting and subsequent solidification and unification when the strap portions are held together after termination of the stroke.

Summary of the invention

In one embodiment, an automatic or semiautomatic power-assisted strapping apparatus is disclosed wherein the sealer includes an actuator that is cocked by pneumatic or other means and then released to power the movable jaw through its friction stroke. In this arrangement, power feed wheels first drive in a feeding direction to assist in forming a strap loop and thereafter drive in an opposite direction to establish desired tension on the loop of strap, with a knurled wheel then being actuated towards a mating anvil to hold the formed loop under established tension in preparation for the sealer actuation. During cocking of the actuator spring, an associated driver cam operates to retract the movable jaw and take up slack in the free strap end. A cutter rides at the front of the movable jaw to sever the free end of strap, while the feed wheels hold such free strap end under tension to facilitate the cutting. The slack take up travel of the movable jaw occurs while the spring is being cocked and is relatively slow. The power stroke travel of the jaw is relatively fast. In a simplified version, a set of coil springs are active upon the jaw both during cocking and during its power stroke. The slow cocking travel precludes strap interface melting whereas the rapid power stroke, under similar pressure conditions, achieves desired melting and ultimate solidification and unification as the springs hold pressure on the jaw following termination of the stroke.

In another embodiment, a manual type of combination tensioner and sealer tool is disclosed wherein a ratchet ad feed wheel unit serve for tension and holding a loop of strap and a sealer is associated with a tension free strap portion to draw slack and thereafter to execute a one way power stroke under predetermined pressure. A unique simplified arrangement employs a single operating handle to control both the tensioner and the sealer. The operating handle is operable by repeated cranking through a first range of swinging movement to ratchet the feed wheel in a direction to draw tension on a strap loop, with loop tension then being maintained by a conventional holding pawl. The operating handle is engaged to the sealer to be movable through an opposite range of swinging movement for cocking an actuator spring and retracting a slidably movable gripper shoe or pressure jaw at slow speed while developing a build up of pressure loading upon the jaw. The retraction of the jaw stores enough slack for a final power stroke during which such slack is taken up. Swinging movement of the operating handle towards a cutting position cocks the spring, retracts and builds up pressure on the movable jaw and before reaching the limit of its movement releases these elements to initiate the power stroke. The operating handle is temporarily held by an abutment while the power stroke is executed and is freed in response to power stroke movement. Upon continued swinging movement of the operating handle, a cutter is actuated to sever the free strap portion adjacent the end of the fused joint. Thereafter, the handle is swung to its opposite limit of movement to release the grip of the tensioning wheel upon the now completed strap loop.

In each of these embodiments, the bodily sliding frictional movement is applied to a slack strap portion by a unidirectional power stroke oriented in the loop direction. This enables article binding tension to be maintained on the loop while the seal stroke occurs. The free strap portion is readily drawn slack in preparation for the power stroke and without interfering with predetermined loop tension. This arrangement facilitates cocking of the actuator spring and enables a spring of convenient size to power the sealer. The pressure loading on the movable jaw in the manual tool embodiment is built up gradually by an eccentric that acts during swing movement of the handle towards its jaw release position. The mechanical advantage associated with the operating handle movement increases so as to reduce the required effort at the high compression travel region. The pressure remains substantially constant throughout the power stroke, and enables necessary softening or melting to be developed in a relatively short friction stroke. Sustained pressure acts at the joint to insure rapid solidification and unification of the melted interface regions after the power stroke.

Rapid release of the tool after joint solidification is facilitated, it merely being necessary to swing the handle throughout its full swinging travel and lift the feed wheel free of the strap to enable loop tension to act on the joint interface region while the same is still warm. In the case of certain thermoplastic materials, this effect stresses the joint in a fashion to increase its ultimate strength.

Other features and advantages of the invention will be apparent from the following description and claims and are illustrated in the accompanying drawings which show structure embodying preferred features of the present invention and the principles thereof, and what is now considered to be the best mode in which to apply these principles.

Brief description of the drawings

In the accompanying drawings forming a part of the specification, and in which like numerals are employed to designate like parts throughout the same.

Description of the preferred embodiments

Referring now to the drawings, for purposes of illustrative disclosure, the invention is shown embodied in an automatic or semiautomatic power-assisted combination strapping apparatus in FIGS. 1 to 4 and is shown embodied in a manual type combination tool in FIGS. 5 to 13. Each of these embodiments is useful with strap of oriented organic thermoplastic material such as nylon, polypropylene and the like but certain aspects of the invention are applicable to other embodiments of combination tools for handling other types of ligature materials.

The power-assisted apparatus illustrated in the sequential views of FIGS. 1 to 4 includes main framing structure 20 having contact foot portions 21 and 22 shown seated upon an article or package P which is represented with a loop of strap S encircling it and having overlapping upper and lower strap end portions U and L, respectively, threaded through the tool. The upper strap end portion U may lead from a suitable supply reel, not shown. Reference is sometimes made hereinafter to the upper and lower strap portions U and L as outer and inner overlapping strap portions.

Figures 1, 1A:
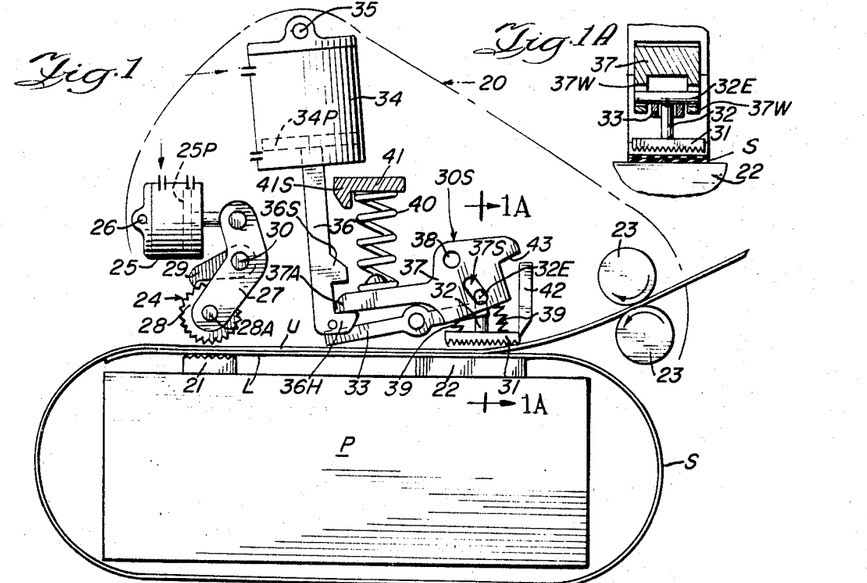
FIG. 1 is a schematic side elevational view of an automatic or semiautomatic apparatus embodying the principles of this invention.
FIG. 1A is a fragmentary detailed sectional view taken on the line 1A—1A of FIG. 1.
Figure 2:
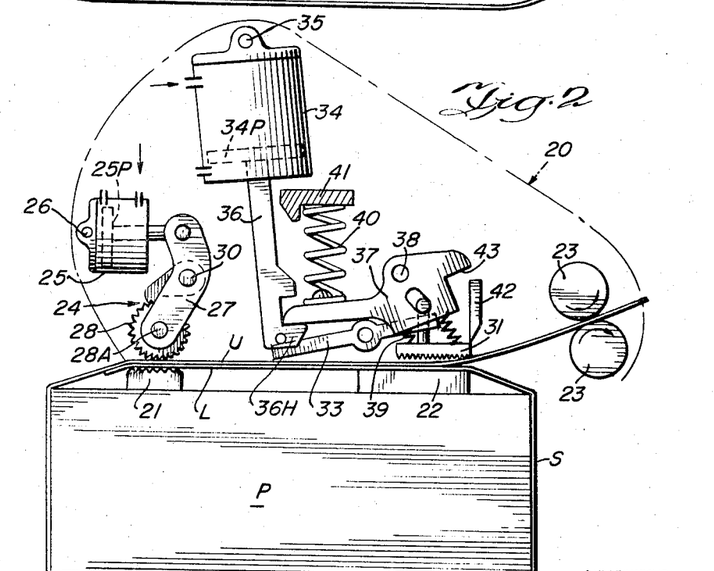
FIGS. 2, 3 and 4 are related schematic views of the apparatus illustrating its operating sequence.
Figure 3:
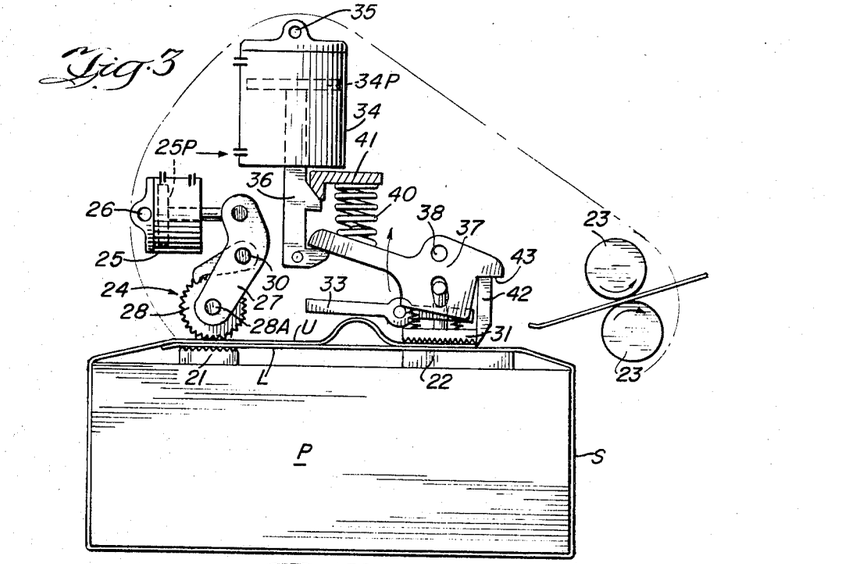

The main frame 20 of the tool serves as a support for the various elements that coact in the functioning of the apparatus. Thus, the main frame 20 carries a pair of feed rolls 23 which are operable as illustrated in FIG. 1 to draw strap from a supply (not shown) and feed the strap around the package to form a loose loop configuration. Any suitable strap chute (not shown) may be provided encircling the package position to assist the feed rolls 23 in guiding the strap into a loop form. Thereafter, the feed rolls 23 are operable, as illustrated in FIG. 2, to establish a desired tension upon the strap loop. The supply end of the strap is cut while tensioned by the feed rolls, as illustrated in FIG. 3, and the loose end is then held ready for feeding a new length of strap to be wrapped about the next package.

The main frame 20 supports a holder mechanism 24 which serves to hold the strap loop under the tension established by the action of the feed rolls 23. This holder mechanism 24 includes a ported control cylinder 25 pivoted about a mounting pin 26 and having a double acting piston 25P. The piston 25P has its rod hinged to one end of a loading link 27, the other end of which carries a mounting axle 28A for the holder wheel 28. The loading link 27 and a holding pawl 29 are pivoted to the main frame 20 on a stationary axis defined by a mounting pin 30, with the holding pawl 29 normally engaging the wheel to allow only one way rotation thereof as indicated by a direction arrow in FIG. 2.

The holder wheel 28 is held elevated while the strap loop is threaded into place, air being applied to the left side of this piston 25P during the strap feeding action pictured in FIG. 1. Then air is admitted to the right of the piston 25P to drive the link 27 in a direction to impress the wheel 28 towards the anvil 21 while the feed rolls 23 pull tension on the strap loop. The lower strap portion L is held fixed against the anvil 21 but the upper strap portion U can move so that slack strap may be drawn from the loop. As the upper strap moves, the wheel 28 executes a one way rotating follower movement while maintaining pressure against the strap. Once prescribed tension is achieved, the holder wheel 28 is effective to hold the upper strap portion against reverse movement and thus loop tension is held.

The sealer facilities are designated generally at 30S and include a floating gripper shoe 31 which serves as a movable jaw spaced above the stationary jaw 22 during loop threading and tensioning as illustrated in FIGS. 1 and 2. The movable jaw 31 has an upstanding central post 32 slotted to receive one end of a pivotally mounted link 33 carried by the main frame. The link 33 is shown in shoe elevating position in FIGS. 1 and 2 to provide sufficient clearance beneath the jaw 31 for required free movement of strap. A power cylinder 34 is pivoted on a mounting pin 35 carried by the main frame. A double acting piston 34P is housed by the cylinder 35 and carries an external drive rod 36. The drive rod 36 when in fully extended position, as illustrated in FIGS. 1 and 2, holds the link 33 in its jaw elevating position.

Controlled sliding movement under predetermined pressure is imparted to the movable jaw by means of a driver cam 37 which is pivoted on a mounting pin 38 carried by the main frame. The driver cam 37 has a bifurcated head defining flanking walls 37W which are provided with corresponding angled slots 37S to receive rod ends 32E carried at the top of the post 32. A set of coil springs 39 react between the drive cam 37 and the jaw 31 to determine the pressure loading of the jaw against the strap. In the embodiment illustrated, the spring loading against the jaw varies somewhat depending upon the angular position of the driver cam 37.

When the strap loop is being threaded into place and tensioned, the driver cam is in the position illustrated in FIGS. 1 and 2, it being held by means of a main drive spring 40 that reacts against a stationary seat 41 fixed to the frame 20 and seats on a lever arm extension 37A of the driver cam. A cutter blade 42 rides on the jaw 31 at its front end and is arranegd to be actuated by an overhanging shoulder 43 on the driver cam to sever the supply end of the strap immediately prior to forming the joint. The strap severing action is illustrated in FIG. 3 wherein the feed rolls 23 are shown acting in a direction to apply tension to the supply end of the strap to facilitate a clean cutting action of the outer overlapping strap portion U.

Figure 4:
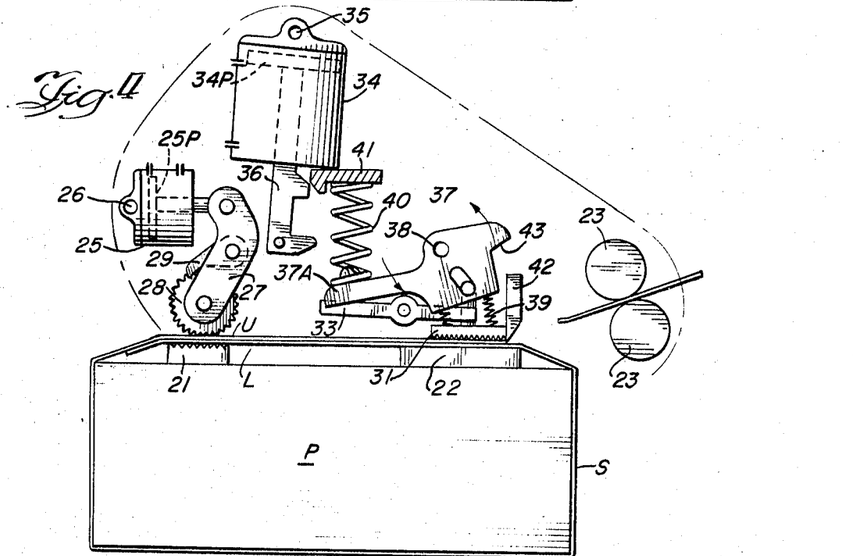

The extremity of the piston rod 36 has a hook formation 36H to engage beneath the lever arm 37A of the driver cam and enable elevation of the piston 34P to cock the main spring 40 by rotating the driver cam to its FIG. 3 position. Initial upward movement of the piston rod 36 frees the link 33 and allows the springs 39 to seat the floatingly mounted movable jaw 31 on the free outer strap portion. The cam, in rotating to its FIG. 3 position, retracts the jaw 31 to draw sufficient slack in the outer strap portion to accommodate the subsequent power stroke. The piston rod 36 has an inclined shoulder 36S at an intermediate region to engage with a mating shoulder 41S on the stationary stop 41 towards the end of the upward travel of the piston 34P. The interaction of the shoulders 36S and 41S swings the piston rod 36 as illustrated in FIG. 4 to release the drive cam 37 and allow the main spring to rotate the drive cam rapidly. The rotation of the drive cam from the FIG. 3 to the FIG. 4 position powers the movable jaw 31 through a rapid forward stroke under substantial pressure. Sufficient pressure continues to act on the jaw at the end of the stroke to enable desired solidification and fusion of the adjacent regions of the overlapping strap portions.

Following a cooling interval of one or two seconds, the piston rod 36 is lowered to engage the link 33 and lift the jaw 31 to enable full loop tension to act upon the friction-fused joint. With some materials such as nylon, the ultimate joint strength is substantially improved by thus stressing the joint while it is still warm.

Figure 5:
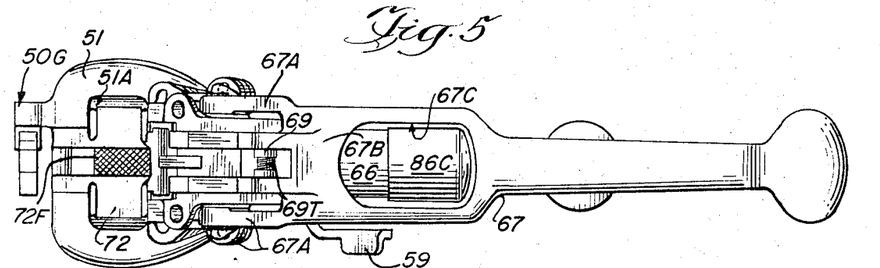
FIG. 5 is a plan view of a manual type combination strap tensioning and sealing tool constructed in accordance with this invention.
Figure 6:
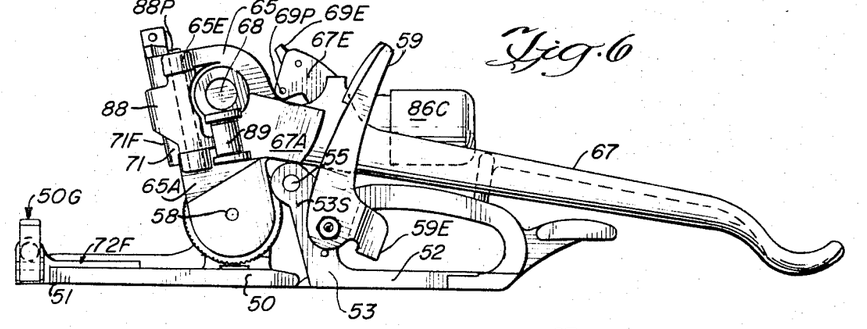
FIG. 6 is a side elevational view of the tool shown in FIG. 5.
Figure 7:
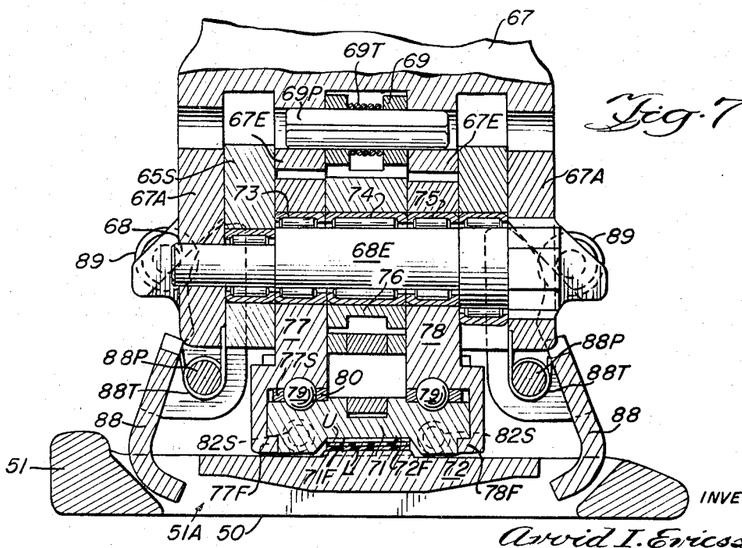
FIG. 7 is a fragmentary enlarged transverse sectional view through the sealer parts of the tool of FIGS. 5 and 6 when the sealer is in strap embracing relation upon the tool base.
Figure 8:
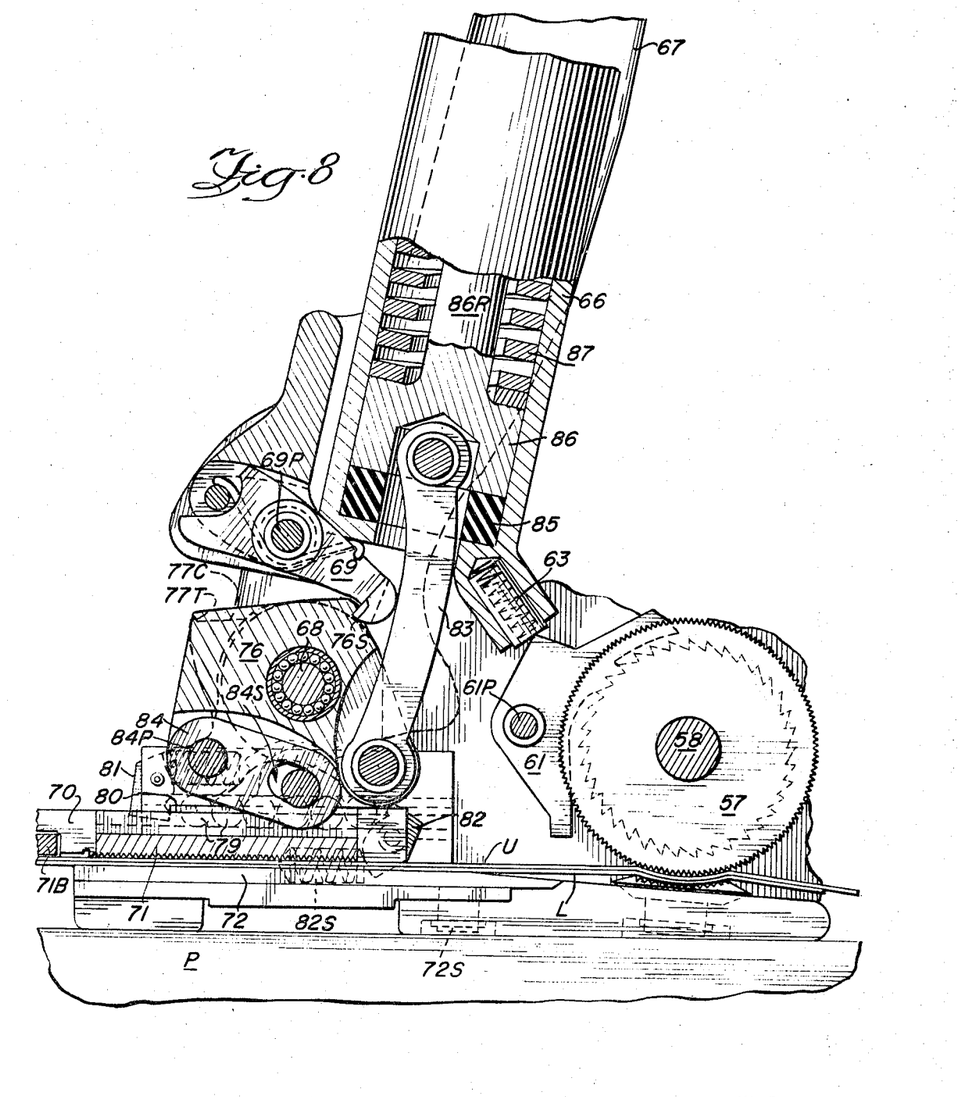
FIG. 8 is an enlarged lengthwise sectional view through the sealer showing the position of the parts after tensioning and prior to cocking of the actuator spring and retracting of the movable jaw.
Figure 9:
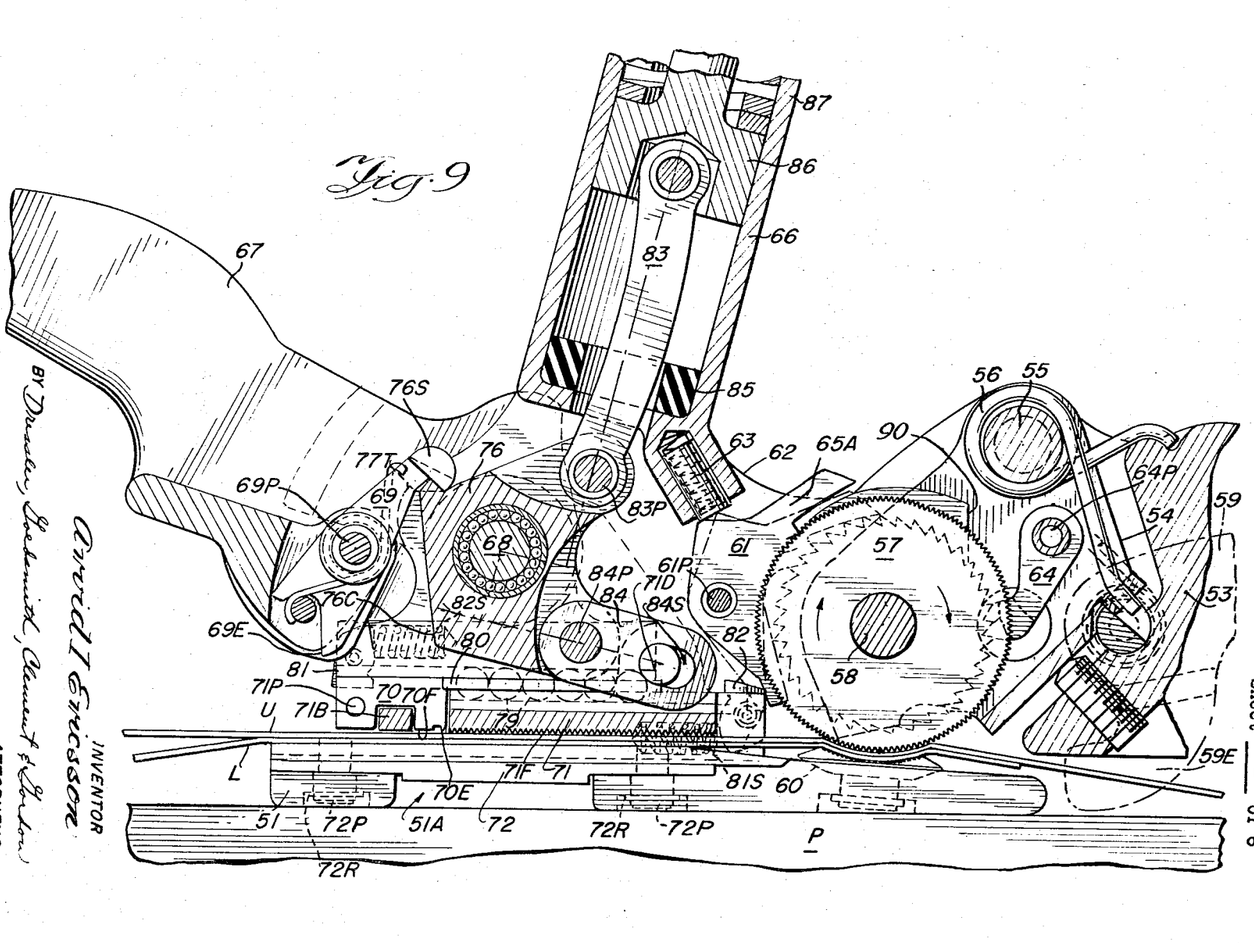
FIG. 9 is a related lengthwise sectional view through the sealer showing the parts cocked and ready for the power stroke.

A manual tool embodiment is illustrated in its entirety in FIGS. 5 and 6. Fragmentary enlargements of the tool are illustrated in FIGS. 8 and 9 where the tool is represented seated upon a package P with a loop of strap S shown encircling the package and having upper and lower strap portions U and L threaded through the tool. The upper strap portion U again may lead from a suitable supply reel (not shown).

The main framing structure of the manual tool consists of a full length base 50 having a stationary main contact portion 51 widened and centrally apertured, as indicated at 51A, at the sealer end of the tool, a handle portion 52 at the opposite end and an intermediate cradle portion 53 joining the handle and main contact portions and including upstanding front and rear side walls 53S spaced apart to define a central chamber. In the complete views of FIGS. 5 and 6, the base 50 is shown mounting a front strap guide 50G to prevent the lower strap from shifting sidewise off the base at the time of loop slack takeup.

The tensioning or loop constricting facilities in the illustrated tool embodiment include a feed wheel carrier 54 (see FIG. 9) of generally U-shaped configuration that nests in the central chamber defined between the base side walls 53S. A mounting pin 55 spans the base side walls 53S and pivotally mounts the U-shaped carrier 54, with a heavy duty torsion spring 56 encircling the pin 55 and reacting between the base and the carrier 54 normally to urge the carrier 54 in a counterclockwise direction. A ratchet and feed wheel unit 57 is journaled on a shaft 58 that rides in the carrier. A manual lock lever 59 is connected to control the carrier 54 for holding the feed wheel adjacent a base mounted anvil 60 which may be in the form of an insert gripper plug. The lock lever 59 includes an extension 59E to serve as a rear strap guide.

To draw tension on the strap loop S, a pulling pawl 61 is mounted on a pin 61P carried by a sealer frame 62 that is swingably mounted on opposite ends of the feed wheel shaft 58. The pulling pawl 61 is normally biased into engagement with the ratchet and feed wheel unit 57 by means of a coil spring 63 carried in the sealer frame 62. When swinging movement is imparted to the sealer frame to repeatedly crank it between the FIG. 8 position and the FIG. 6 position, the pulling pawl 61 rotates the feed wheel to advance the outer strap portion U while the anvil 60 holds the lower strap portion L. Finally, a holding pawl 64 is journaled on a pivot pin 64P mounted on the carrier 54 to engage the ratchet and feed wheel unit 57 and prevent reverse rotation thereof. While a link-type feed wheel loading system is disclosed, an eccentric feed wheel system could also be utilized.

Figures 10, 11, 12, 13:
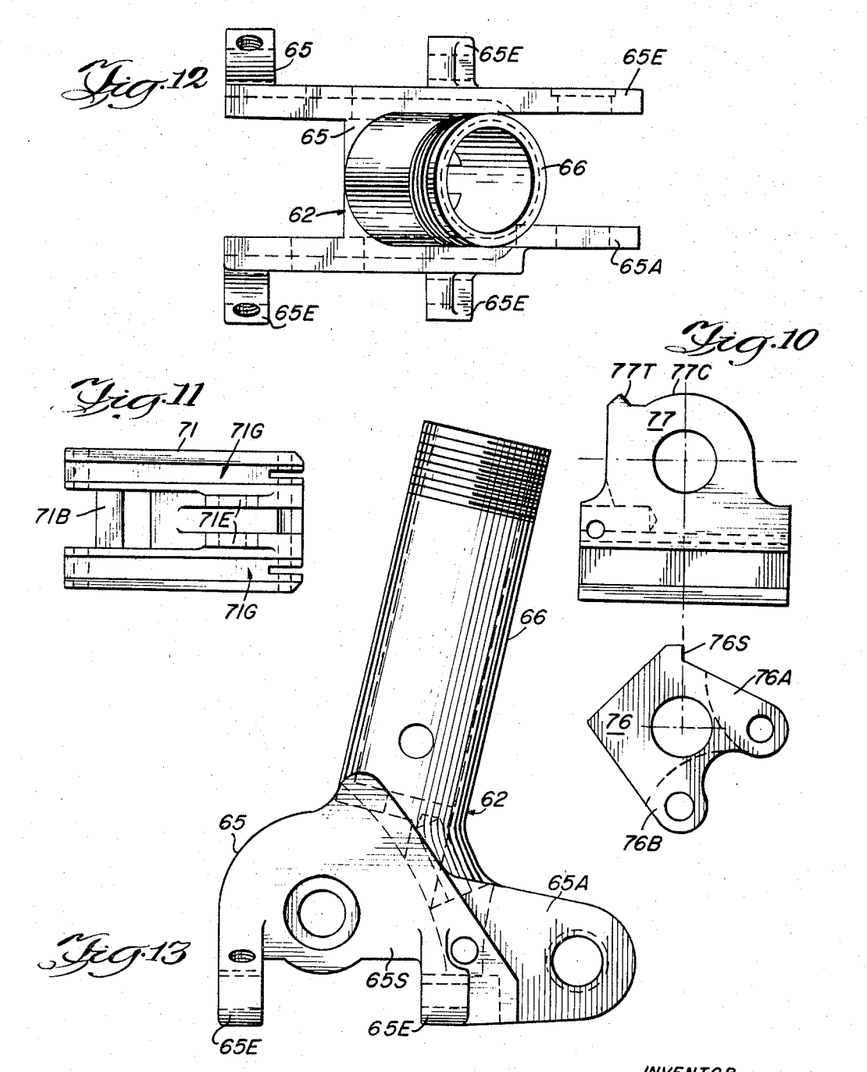
FIG. 10 is an exploded elevational view of a bell crank and a shoe support utilized in the sealer.
FIG. 11 is a plan view of the movable jaw.
FIG. 12 is an elevational view of the sealer frame.
FIG. 13 is a plan view of the sealer frame.

The sealer frame, as best seen in FIGS. 6 and 13, is swingably mounted from the feed wheel shaft 58 and carries the operating parts of the friction-fusion joint forming mechanism. The sealer frame 62, as illustrated in the isolated views of FIGS. 12 and 13, has a hollow head 65 and a spring housing 66 integrally projecting from the head and defining a spring chamber that communicates with the interior of the head. The head 65 is defined by flanking side walls 65S having correspondingly extending apertured arm portions 65A that are journaled on the feed wheel shaft 58.

A sealer handle 67 terminates in a forked connector end constituted by front and rear mounting arm portions 67A that have aligned openings to embrace the head 65 of the sealer frame and receive opposite ends of a sealer shaft 68 in rotatably driving relationship. The sealer shaft 68 projects crosswise through the center of the head 65 and is rotatable relative thereto. To accommodate the desired range of swinging movement of the sealer handle and the sealer shaft relative to the sealer frame 62, a central clearance aperture 67C is provided intermediately along the shank of the handle to receive the spring housing 66 of the sealer frame in nested relation (see FIG. 5). The sealer handle has an upwardly bowed portion 67B adjacent the clearance 67C to embrace the spring housing 66 when it nests within the clearance aperture 67C. This bowed portion carries a pair of ears 67E that are located in side by side spaced relation to receive and cooperatively support opposite ends of a mounting pin 69P. A handle pawl 69 is pivotally mounted on the pin 69P and is described in more detail hereinafter.

The friction-fusion joint forming facilities include a cutter 70 pivotally mounted in nested relation in a floatingly mounted movable pressure jaw 71 carried in the sealer frame to face through the open bottom of the sealer head 65 and cooperate with an anvil or stationary pressure jaw 72 that is nested within the base socket 51A provided in the contact foot portion. Anvil support pins 72P brazed into anvil 72 are secured by lock rings 72R to hold the anvil to base 51, as shown in FIG. 9. The contact face 72F presented by the sealer anvil is smooth at the end where the cutter operates and is roughened at the remaining region engaged by the inner strap portion L which is under full loop tension and not likely to shift. The roughened contact face 72F on the anvil is longer than the contact face 71F on the movable jaw 71 by an amount sufficient to accommodate the power stroke travel of the jaw 71. Thus, the jaw contact face 71F terminates adjacent the line of action of the cutter 70. The jaw 71 has an integral cross bar 71B forwardly spaced from the main jaw face 71F, this bar presenting a separate strap contact face to generate friction heat in advance of the main jaw face 71F and thereby obtain fusion of the joint region up to the extreme forward end of the main face.

The cutter 70 is of inverted U-shaped outline and is mounted on a jaw pin 71P to straddle the integral cross bar 71B that spans an open central region (FIG. 11) at one end of the movable jaw 71. The cutter 70 presents a gauge face 70F to define a strap contact plane and the cutter carries a knife edge 70E projecting beyond that plane a distance corresponding to the thickness of the upper strap U. The cutter is thereby accurately gauged to the strap thickness so as to reliably cut the upper strap U without weakening the corresponding region of the lower strap L.

The sealer shaft 68 has an eccentric portion 68E rotatable within the sealer head 65 to operate the sealer parts in predetermined sequence under the control of the sealer handle 67. A set of three antifriction bearings 73, 74 and 75 ride on this eccentric shaft portion 68E, the center bearing 74 carrying a bell crank 76 and the flanking bearings carrying a pair of jaw or shoe supports 77, 78 that lie alongside the sealer head side walls 65S and present an upper edge contour 77C that terminates in a corner trip 77T (see FIGS. 8 and 10) to control release of the handle pawl 69 from the bell crank 76.

The eccentric portion 68E of the sealer shaft defines a common center for the principal sealer parts and facilitates the construction and mechanization of the sealer functions. The common center relationship provides a convenient mounting for the bell crank 76 and shoe supports 77, 78, simplifies strap compression by the movable jaw 71 and provides easy adaptation of the jaw face 71F to the elevation of the strap surface. Differing strap thickness and part variations introduce alignment problems which are obviated by the common center construction of this tool.

The supports 77, 78 also provide depending outboard arms terminating in inwardly directed flanges 77F and 78F to seat in bottom corner recesses of the movable jaw 71 and thereby support the jaw for sliding movement across the bottom face of the sealer frame. Each of the supports 77, 78 presents a downwardly facing shoulder 77S, 78S having a lengthwise groove mating with corresponding upwardly facing grooves 71G (FIG. 11) provided in the top of the movable jaw collectively to define parallel races each of which receives a set of ball bearings 79. A separate elongated ball retainer frame 80 is provided for each set of ball bearings 79 and is shiftably controlled to reset the balls for maintaining a stable pressure transmitting relation between the jaw 71 and the supports 77, 78 during repeated sliding operations of the movable jaw. For this purpose, each of the supports 77, 78 carries a separate pivotally mounted control link 81 normally acted upon by individual bias springs 81S carried endwise in each support and the jaw 71 pivotally mounts a pair of control links 82 normally acted upon by individual bias springs 82S carried endwise in the shoe. These control links 81, 82 have endwise engagement with the ball retainer frames 80 to recenter the frames and the balls after each stroke for enabling pressure to be applied in a balanced antifriction relationship.

The sealer handle 67 carries the handle pawl 69 for swinging movement about the axis of the sealer shaft 68. A torsion spring 69T encircles the mounting pin 69P for the handle pawl 69 and normally biases the handle pawl in a clockwise direction as viewed in FIGS. 8 and 9 to engage a peripheral shoulder 76S presented by the bell crank 76. The bell crank has a first bifurcated corner providing ears 76A apertured to receive a pivot pin 83P for a connecting rod 83 and has a second bifurcated corner providing ears 76B to receive a pivot pin 84P for an impact link 84. The impact link 84 is connected in lost-motion relation to the movable jaw 71 by means of a drive pin 71D carried between upstanding flanking ears 71E (FIG. 11) integrally formed on the jaw, with the drive pin 71D being engaged in an elongated slot 84S provided in the impact link. The lost-motion connection of the link 84 to the jaw 71 creates an impact effect aiding initial acceleration of the jaw 71. If no impact effect were required (either due to greater spring pressure or to lower friction strap), the bell crank could have a pinion form to engage a rack on the jaw 71. The connector rod 83 leads through an annular cushion 85 seated in the base of the spring chamber and is swivelly connected to the head end of a movable spring seat 86 slidable in the spring housing 66 and including a central guide rod 86R projecting through a high strength main spring 87. The opposite end of the spring is seated against head cap 86C at the top of the spring housing (see FIGS. 5 and 6).

When the sealer shaft is rotated by swinging the sealer handle 67 from the FIG. 8 position toward the FIG. 9 position, the bell crank 76 and the supports 77, 78 are forced down by the eccentric shaft portion 68E to lower and impress the jaw upon the overlapping strap portions which overlie the stationary pressure jaw presented by the anvil 72. Lifting reaction against the frame associated with this strap compression is taken by a pair of reaction jaws 88. During rotation of the sealer handle 67 from the FIG. 8 position towards the FIG. 9 position, the bell crank is rotated counterclockwise under the control of the handle pawl 69 which engages the bell crank shoulder 76S.

Counterclockwise rotation of the bell crank 76 lifts the connector rod 83 and the spring seat 86 for compressing the main spring 87. Simultaneously, the drive link 84 carried by the bell crank 76 retracts the movable jaw 71 to draw the outer strap portion U into a slack relationship. The spring 87 is substantially fully compressed, and the jaw is substantially fully retracted when the sealer handle reaches the intermediate position represented in FIG. 9. The center line of action of the spring 87 is related to the eccentric shaft portion 68E to provide an increasing mechanical advantage with increasing spring compression. The particular arrangement disclosed is such that handle effort actually decreases at this stage.

Upon further rotation of the sealer handle 67, the handle pawl 69 rides onto an abutment in the form of corner trips 77T provided integrally on the supports 77, 78 and lifts off the bell crank shoulder 76S to free the bell crank. The fully cocked main spring 87 immediately drives the bell crank clockwise for powering the movable jaw 71 through a rapid friction stroke. This reverse rotation of the bell crank 76 brings an integral corner cam 76C into play to kick the handle pawl 69 free and enable continued movement of the sealer handle 67. By this time, however, the power stroke travel is completed. The action is so rapid that a normal handle stroke, while interrupted briefly, continues as if automatic.

After completion of the friction stroke, the movable jaw 71 holds pressure no the strap portions U and L until interface fusion and solidification is effected. The cutter 70 which rides on the shoe 71 is now outboard of the sealer head 65. During this cooling interval, the continued movement of the sealer handle 67 brings a handle pawl extension 69E against the shoe to drive the cutter knife edge 70E through the upper strap portion U immediately adjacent the joint, the cutting stroke being limited by contact of the gauge face 70F against the upper strap. The preheat effect associated with the bar 71B enables joint fusion up to the extremity of the jaw 71 so that strap cut off is substantially exactly at the joint edge.

During the friction stroke, the sealer handle 67 is in a position wherein the eccentric shaft 68 exerts a maximum and substantially uniform pressure through the supports 77, 78 and against the jaw 71. The balls 79 enable antifriction movement of the pressure loaded jaw 71 and are important in enabling the spring 87 to produce an effective power stroke.

It is necessary to lock the sealer frame in its down position to enable pressure to be exerted through the jaw 71 upon the overlapping strap portions that rest upon the sealer anvil 72. For this purpose, the reaction jaws 88 are swingably mounted on pivot pins 88P carried by fore and aft spaced outboard ears 65E integrally carried alongside the sealer head 65. The sealer handle 67 has its side arms 67A provided with outboard ears to carry a rotatably mounted cam roller 89. The relationship of the sealer handle 67 to the sealer head 65 is such that the cam roller 89 holds the reaction jaws 88 in flared relation during tensioning and during initial handle rotation following seating of the sealer frame 62 upon the base 51. Thereafter, rotation of the sealer handle 67 towards the FIG. 9 position, and while the sealer frame is stationary, lifts the cam rollers 89 to free the jaws 88. Torsion springs 88T associated with each jaw pin 88P then swing each jaw beneath the corresponding lateral edge of the sealer anvil 72. Further rotation of the sealer handle 67 to bring the eccentric shaft portion 68E into pressure applying relation is carried out while the reaction jaws 88 are locked beneath the anvil.

In the particular manual tool arrangement disclosed herein, a maximum spring force of 250 pounds is employed and the travel stroke is about ⅞ of an inch in the presence of load pressure of about 1500 p.s.i. at the contact face 71F of the jaw. The contact face 71F presented by the jaw is ½ inch by 1⅝ inches to achieve a joint area of about 1⅝ x ½ and a joint strength of 300–400 pounds. These relationships enable a short base tool construction and it should be noted that the joint strength is not significantly improved by increasing the length of the pressure face or by increasing the pressure or the spring force. A tool utilizing these values for stroke length, pressure and joint length may conveniently be constructed with a sealer handle 10 inches long and requiring a hand force of 10 to 15 pounds for cocking the spring.

Operation of the manual tool through a complete tensioning and sealing cycle may now be described. The tool is swung to the open position which is illustrated in FIGS. 5 and 6 to receive the overlapping upper and lower strap portions U and L after the strap has been formed into a loop about the article A. The sealer handle 67 is then repeatedly cranked through a range of swinging movement between the FIG. 6 position and the FIG. 8 position to ratchet the feed wheel unit 57 and pull tension on the strap loop. During this range of swinging movement, the sealer handle 67 and the sealer frame 62 move in unison about the axis of the floatingly mounted feed wheel shaft 58, with the tensioning pawl 61 and holding pawl 64 repeatedly engaging, advancing and holding the feed wheel. During the tensioning cycle, the sealer parts which are carried in the sealer frame are free of the strap.

When desired tension is achieved, the sealer handle 67 is moved to the FIG. 8 position to seat the sealer frame 62 in straddling relation upon the outer and inner strap portions U and L that overlie the stationary sealer jaw 72. At this point, the rotary position of the sealer shaft 68 is such that the supports 77, 78 hold the movable sealer jaw at a minimum pressure relation with respect to the strap. Initial swinging movement of the handle 67 with respect to the sealer frame 62 releases the cam rollers 89 and enables the reaction jaws 88 to swing beneath the stationary sealer jaw 72 to take the reaction that develops as the movable jaw or shoe 71 is impressed upon the strap. Upon further rotation of the sealer handle 67 towards the FIG. 9 position, the sealer shaft rotates to lower the supports 77, 78 and pressure load the movable jaw 71 onto the strap.

The swinging movement of the sealer handle also causes the handle pawl 69 to rotate the bell crank 76 for cocking the main spring 87 and retracting the movable sealer jaw 71. Retraction of the jaw is accompanied by gradually increasing pressure of the jaw against the outer strap section U, enabling this outer strap section to be drawn slack. The cutter 70 which nests in the movable sealer jaw 71 rides with it but is inactive at this point of the cycle. Retraction of the jaw 71 kicks the tensioning pawl extension 61E to disengage the tensioning pawl, with the spring 63 holding the same disengaged, to enable return of the sealer handle, after joint formation, without producing strap tensioning movement of the feed wheel.

When the swinging movement of the sealer handle brings the bell crank 76 to and beyond the FIG. 9 position, the handle pawl 69 begins to lift free of the bell crank as it rides onto the corner trips 77T, 78T provided on the supports 77, 78. At this point, substantially maximum pressure is being applied to the strap by the movable jaw and the spring 87 fires to power the jaw 71 through a rapid one way travel stroke to effect bodily sliding frictional movement of the outer strap portion against the inner strap portion sufficient to achieve interface melting between the frictionally contacting strap surfaces. The sealer jaws 71 and 72 continue to act on the stationary strap portions to effect solidification of the melted surface regions that are held in stationary broad area fusing contact.

The power stroke of the shoe 71 returns it to a position such as is illustrated in FIG. 8 wherein the cutter 70 is exposed. The swinging movement of the handle 67 is continued beyond its FIG. 9 position after the movable jaw 71 has completed its power stroke. Further movement of the sealer handle brings it into camming engagement with the exposed cutter 70 to sever the outer strap section closely adjacent the fused joint.

The sealer handle and the sealer frame are now swung to the position illustrated in FIG. 6 to release the tool from the completed strap loop. During this return movement, the tensioning pawl is inactive but at the end of such movement the pawl engagement is reestablished when the tip of the pawl 61 strikes the spring 56. Correspondingly, a cam shoulder 90 disengages the holding pawl 64 to free the feed wheel to release the strap.

Thus, while preferred constructional features of the invention are embodied in the structure illustrated herein, it is to be understood that changes and variations may be made by those skilled in the art without departing from the spirit and scope of the appended claims.

What is claimed is:

1. Apparatus for joining overlapping thermoplastic strap portions, said apparatus having means including confronting movable and stationary pressure jaws conjointly operative for holding one of said strap portions against the other of said strap portians, means for retracting the movable pressure jaw in a direction to draw up slack in said one strap portion, and drive means for shifting the movable jaw through a stroke while said pressure jaws are holding said strap portions together to produce one way bodily sliding movement between frictionally contacting surfaces of said strap portions and effect melting of such surfaces followed by stationary fusing of the melted surfaces to unify said overlapping strap portions.

2. Apparatus for providing a ligature in binding engagement about an article by closing a loop of thermoplastic strap that encircles the article and has outer and inner overlapping strap portions, said apparatus having means including confronting movable and stationary pressure jaws conjointly operative for holding a tension-free region of one said strap portion against a loop region of the other said strap portion, means operable while said jaws are holding said strap portions together for retracting the movable pressure jaw in the loop direction to draw up slack in the tension-free region of the outer strap portion, and drive means for powering the movable jaw through a return stroke while said pressure jaws are holding said strap portions together to produce one way bodily sliding movement between frictionally contacting surfaces of said strap portions and effect melting of such surfaces followed by stationary fusing of the melted surfaces to unify said overlapping strap portions.

3. Power strapping apparatus for providing a ligature in binding engagement about an article, said apparatus including means for feeding thermoplastic strap to form a loop encircling the article and having outer and inner overlapping strap portions, means including confronting movable and stationary pressure jaws conjointly operable for holding said strap portions together, means for retracting the movable pressure jaw in a loop direction to draw up the slack in one of said strap portions, and drive means for powering the movable jaw through a return stroke while said pressure jaws are holding said strap portions together to produce one way bodily sliding movement between frictionally contacting surfaces of said strap portions and effect melting of such surfaces followed by stationary fusing of the melted surfaces to unify said overlapping strap portions.

4. Apparatus for joining overlapping thermoplastic strap portions, said apparatus having means including confronting movable and stationary pressure jaws conjointly operative for holding one of said strap portions against the other of said strap portions, said movable jaw having a separate strap contacting face spaced in advance thereof to initially overlie the stationary jaw, and means for driving the movable jaw and separate strap contacting face through a power stroke while said pressure jaws are holding said strap portions in contact to produce one way bodily sliding movement between frictionally contacting surfaces of said strap portions and effect melting of the surfaces up to the forward edge of the movable jaw followed by stationary fusing of the melted surfaces to unify said overlapping strap portions.

5. Apparatus in accordance with claim 4 and including means operable while said jaws are holding said strap portions together for retracting said movable jaw prior to the power stroke for drawing up slack in said one strap portion, and means mounting a cutter for shifting movement at a region intermediate of said movable jaw and said separate strap contacting face to sever the said one strap portion at a region adjacent the forward edge of the movable jaw.

6. Apparatus in accordance with claim 5 and including a movably mounted actuator for operating the cutter element, positive stop means normally limiting cutter operating movement of the actuator, and means responsive upon power stroke movement of the movable jaw to free the actuator for operating the cutter.

7. In apparatus for joining overlapping thermoplastic strap portions, fusion joint forming means for heating said overlapping strap portions and including confronting pressure jaws conjointly operative for holding melted interface surface regions of said overlapping strap portions in stationary fusing contact to achieve interface solidification and unification of the overlapping strap portions, means pivotally mounting a cutter element for shifting movement alongside one of said jaws, said cutter having a generally planar gauge face to contact the exposed surface of one of said strap portions and having a cutting edge projecting beyond the plane of the gauge face a distance corresponding to the thickness of such strap portion, and an actuator for pivoting the cutter element to sever a region of the last-named strap portion.

8. Apparatus for providing a ligature in binding engagement about an article by closing and severing a loop of thermoplastic strap that encircles the article and has outer and inner overlapping strap portions, said apparatus having fusion joint forming means including confronting pressure jaws conjointly operative for holding interface surfaces of said overlapping strap portions in frictional contact, and drive means connected to effect bodily sliding movement concurrently relative to each of said interface surfaces while said pressure jaws are compressing said overlapping strap portions to effect melting of such surfaces followed by stationary fusing of the melted surfaces to unify said overlapping strap portions, means mounting a cutter element for pivotal movement alongside one of said jaws, said cutter having a generally planar gauge face to contact the exposed surface of one of said strap portions and having a cutting edge projecting beyond the plane of the gauge face a distance corresponding to the thickness of such strap portion, and an actuator for pivoting the cutter element to sever a region of the last-named strap portion.

9. In a sealer mechanism for forming a fused joint by effecting controlled bodily sliding frictional movement between overlapping thermoplastic strap sections, a sealer base presenting a stationary pressure jaw, a sealer frame shiftably mounted from the sealer base to move between a sealer position straddling said pressure jaw and an elevated position, said sealer frame carrying means slidably mounting a movable pressure jaw confronting and pressure loaded toward the stationary jaw when the sealer frame is in sealer position, drive means carried by the sealer frame, reversibly operating force transmitting mechanism connected to shift the movable jaw, actuating means releasably connected to move said force transmitting mechanism until the movable jaw has drawn predetermined slack in the strap section contacted thereby and abutment means carried by the sealer frame and responsive upon further movement of said actuating means to free the force transmitting mechanism and movable jaw for return movement and enable the drive means to provide a rapid power stroke of the movable jaw producing bodily sliding frictional movement and interface melting between said strap sections.

10. In a sealer mechanism in accordance with claim 9 and including a cutter riding on the movable jaw and shiftable relative thereto to sever the strap portion contacted by the movable jaw and wherein said abutment means holds said actuating means against further movement and wherein said force transmitting means has a cam engageable during return movement thereof to free the actuating means for continued movement to operate the cutter at the end of the power stroke.

11. Apparatus for providing a ligature in binding engagement about an article by tensioning and sealing a loop of thermoplastic strap that encircles the article and has overlapping strap portions defining a loop closure region, said apparatus having tensioning means engageable with the strap at opposite extremities of the loop for drawing said overlapping sections in a direction to tension and hold the loop in article binding engagement, means including confronting movable and stationary pressure jaws conjointly operative for compressing a tension-free region of said outer strap portion against a tensioned region of said inner strap portion to establish frictionally contacting interface surface regions, drive spring means connected to shift said movable jaw, releasable actuator means for cocking said drive spring means and for concurrently retracting said movable jaw and the strap portion contacted thereby to create free slack and enable said drive spring means to power said movable jaw through a rapid unidirectional power stroke before release of said pressure jaws to produce unidirectional bodily sliding movement between the frictionally contacting interface surface regions to melt such interface regions and enable subsequent stationary compression of such melted interface regions between said pressure jaws to fuse and solidify the same.

12. Apparatus in accordance with claim 11 and wherein a rotary cam is connected in reversible force transmitting relationship between the movable jaw and the drive spring means and said actuating means is engageable to rotate said cam in one direction for concurrently compressing the drive spring means and linearly retracting the movable jaw.

13. Apparatus for forming a ligature in binding engagement about an article by tensioning and sealing a thermoplastic strap disposed in a strap loop encircling the article and having outer and inner strap sections overlapping along a loop closure region, said apparatus including a main frame having base structure to engage the article adjacent the loop closure region, tensioning mechanism mounted from the main frame and including an anvil carrier on the main frame and engageable to grip a first portion of the inner strap section and a wheel rotatably carried on the main frame and engageable to grip a portion of the outer strap section overlying said first portion to draw tension on said loop and establish the loop in article binding engagement, sealing mechanism mounted from the main frame and spaced from the tensioning mechanism along a lengthwise loop direction and having first jaw means engageable with a tensioned second portion of said inner strap section and having second jaw means confronting said first jaw means and engageable with a tension-free second portion of the outer strap section, pressure means for compression loading said first and second jaw means against said second portions of strap to establish frictionally contacting interface surface regions between the said second portions while said tensioning mechanism independently holds the loop in article binding engagement, drive spring means mounted from said main frame and connected to power said second jaw means through a unidirectional power stroke in a plane parallel to the contacting interface regions, releasable means for retracting said second jaw means and the tension-free strap portion contacted thereby to create free slack and for concurrently cocking said drive means to enable said drive spring means to power said second jaw means through a rapid unidirectional power stroke before release of said jaw means to produce limited unidirectional bodily sliding movement between said frictionally contacting interface surface regions to melt said interface regions and enable subsequent stationary compression of such melted interface regions between said jaw means to fuse and solidify the same.

14. Apparatus in accordance with claim 13 and wherein said releasable means includes a rotary cam having lost motion connection to said second jaw means and having reversible engagement with the drive spring means and pulling mechanism engageable to rotate said cam for concurrently compressing the drive spring means and linearly retracting the movable jaw.

15. A combination tool for tensioning and sealing a loop of thermoplastic strap in binding engagement about an article, said tool having a main frame including base structure to contact the article and having a tensioning anvil and a stationary pressure jaw, means mounting a rotary feed wheel and feed wheel shaft to cooperate with the anvil, a sealer frame swingably mounted about said feed wheel shaft to move between a sealer position straddling said pressure jaw and an elevated position, an actuator shaft mounted in said sealer frame and carrying support means slidably mounting a movable pressure jaw confronting the stationary jaw when the sealer frame is in sealer position, drive means mounted in the sealer frame, reversible force transmitting mechanism on said actuator shaft and connected to control supply of energy to said drive means and concurrently to retract said movable jaw, and a sealer handle drivingly pivoted on said actuator shaft to swing conjointly with the sealer frame during a first range of swinging movement about said feed wheel shaft for effecting one way rotation of the feed wheel, said sealer handle rotatably driving said sealer shaft while pivoting relative to said sealer frame to lower the movable jaw towards the stationary jaw and to shift said force transmitting mechanism.

16. A combination tool for tensioning and sealing a loop of thermoplastic strap in binding engagement about an article, said tool having a main frame including base structure to contact the article and having a tensioning anvil and a stationary pressure jaw each to contact the inner strap portion, a transverse feed wheel shaft mounting a feed wheel for movement towards and away from said anvil, a sealer frame swingably mounted about said feed wheel shaft to move between a sealer position straddling said pressure jaw and a remote position, said sealer frame having a hollow head portion and a spring housing projecting therefrom, reaction arms shiftably mounted on said sealer frame to engage said base structure for locking the sealer frame in sealer position, a transverse sealer shaft rotatably mounted in said hollow head portion and having an eccentric section within the head portion, a bell crank and flanking shoe supports within said head portion and journaled on the eccentric portion of said sealer shaft, a shoe carried conjointly by said supports in antifriction sliding relation and presenting a movable pressure jaw confronting the stationary pressure jaw when the sealer frame is in sealing position, a cutter riding on said shoe and presenting a cutter edge to contact the strap adjacent the movable jaw, a drive spring in said spring housing and having reversible driving connection to the bell crank, a drive link in reversible lost motion driving connection between the bell crank and shoe, a sealer handle pivoted on said sealer frame to swing conjointly therewith during a first range of swinging movement about said feed wheel shaft, a tensioning pawl on said sealer frame to engage and rotate the feed wheel unidirectionally during such swinging movement of the sealer frame, said sealer handle having cam means to shift the reaction arms out of engagement with the base structure, said sealer handle rotatably driving said sealer shaft while pivoting relative to said sealer frame to lower the movable jaw towards the stationary jaw, and a handle pawl on said sealer handle to rotate the bell crank and concurrently cock the drive spring and retract the movable shoe to draw slack towards the feed wheel, one of said shoe supports having an abutment engageable to lift and hold the handle pawl free of the bell crank to release the drive spring for powering the movable shoe through a rapid stroke to expose the cutter while the sealer shaft maintains the movable jaw pressure loaded towards the stationary jaw, said bell crank undergoing reverse rotation to free the handle pawl from said abutment during power stroke movement of the movable shoe and means on the sealer handle to engage and actuate the cutter upon further pivoting movement of the sealer handle following the power stroke of the shoe.

17. In a sealer mechanism for forming a fused joint between overlapping thermoplastic strap sections, a sealer base presenting a stationary pressure jaw, a sealer frame shiftably mounted from the sealer base to move between a sealer position straddling said pressure jaw and an elevated position, a sealer shaft mounted in said sealer frame and carrying support means slidably mounting a movable pressure jaw confronting and pressure loaded toward the stationary jaw when the sealer frame is in sealer position, drive spring means mounted in the sealer frame, reversibly operating force transmitting mechanism on said sealer shaft and connected to compress said drive spring means concurrently with retracting said movable jaw, and power applying actuating means releasably connected to shift said force transmitting mechanism until the drive spring means is compressed and the movable jaw has drawn slack in the strap section contacted thereby sufficient to accommodate a rapid power stroke of the movable jaw to produce bodily sliding frictional movement and interface melting between said strap sections.

18. In a sealer mechanism for forming a fused joint by effecting controlled bodily sliding frictional movement between overlapping thermoplastic strap sections, a sealer base presenting a stationary pressure jaw, means mounting a movable pressure jaw confronting the stationary jaw and pressure loaded theretoward to compress said overlapping strap sections into frictional interface contact, drive spring means, reversibly operable force transmitting mechanism connected between said drive spring means and said movable jaw to compress said drive spring means and retract said movable jaw along said stationary jaw, and power applying actuating means releasably connected to shift said force transmitting mechanism until the drive spring means is compressed and the movable jaw has drawn slack in the strap section contacted thereby sufficient to accommodate a rapid power stroke of the movable jaw to produce controlled bodily sliding frictional movement and interface melting between said strap sections.

19. In a sealer mechanism in accordance with claim 18 and wherein the movable jaw is provided by a slidably mounted shoe and the force transmitting mechanism is a rotary shaft mounted cam hingedly connected to the shoe.

20. In a sealer mechanism in accordance with claim 18 and wherein the movable jaw is provided by a slidably mounted shoe, a shaft mounted rotary cam has reversible driving connection to said shoe and has a rigid lever arm extension that provides a seat to said drive spring means, and a fluid powered cylinder has a double acting piston and rod releasably engageable with the lever arm extension to compress the drive spring means.

21. In a sealer mechanism in accordance with claim 18 and including a sealer frame shiftably mounted on the sealer base and having a hollow head portion and a spring housing portion communicating therewith and containing said drive spring means, a sealer shaft journaled in said head portion and mounting a rotary bell crank and a support for slidably mounting the shoe, said force transmitting mechanism including means connecting the drive spring means to the rotary bell crank and means connecting the bell crank to the shoe and a sealer handle pivoted on said shaft and having a pawl releasably engaging the bell crank to rotate the same until the drive spring means is compressed.

22. A process for providing a ligature in binding engagement about an article comprising, providing a length of thermoplastic strap and forming the strap into a tensioned loop encircling the article so that the strap has overlapping end portions, compressing said overlapping strap portions into frictional engagement, and causing single stroke travel of a tension free region of one of the strap portions to provide one way bodily sliding frictional movement between contacting surface regions of said overlapping strap portions until interface melting occurs while said tensioned loop is maintained about the article and while retaining said overlapping strap portions compressed, whereby the melted surface regions fuse to achieve interface solidification between the overlapping strap portions.

23. A process as set forth in claim 22 wherein the step of causing single stroke travel is preceded by the step of moving said one strap portion in a direction to draw a slack therein.

24. A process as set forth in claim 22 in which the step of compressing said overlapping strap portions is performed by positioning the overlapping strap end portions between a pair of gripping jaws and moving at least one of the jaws into strap compressing relationship with the other jaw, said step of causing single stroke travel being preceded by the step of moving said gripping jaw in a direction to draw a slack in said one strap portion, said step of causing single stroke travel being performed by moving said one jaw in a direction opposite to said first mentioned direction.

25. A process as set forth in claim 24 wherein the movement of said jaw in said opposite direction is restricted to drawing the slack created by movement of the jaw in said one direction.

References Cited

UNITED STATES PATENTS

| 2,741,885 | 4/1956 | Allison | 53—198 |
| 2,982,069 | 5/1961 | England | 53—198 |
| 3,126,680 | 3/1964 | Baird et al. | 53—3 |
| 3,184,354 | 5/1965 | Strother | 156—73 |
| 3,269,300 | 8/1966 | Billett et al. | 100—8 |

FOREIGN PATENTS

| 149,296 | 10/1960 | U.S.S.R. |
| 509,241 | 7/1939 | Great Britain. |
| 1,014,988 | 12/1965 | Great Britain. |

OTHER REFERENCES

Freres, Robert N.: Fabrication With Friction Heat. In Modern Plastics, November 1945, pp. 142–145.

EARL M. BERGERT, *Primary Examiner.*

D. J. FRITSCH, *Assistant Examiner.*

U.S. Cl. X.R.

53—3, 39, 198; 83—8; 100—2, 29, 33; 156—530, 580